April 14, 1925.	1,533,578

G. W. WALKER

ANIMAL SPRAYING ATTACHMENT FOR MILKING MACHINES

Filed March 16, 1923    3 Sheets-Sheet 1

Witnesses:

G. W. Walker,
Inventor

April 14, 1925. 1,533,578
G. W. WALKER
ANIMAL SPRAYING ATTACHMENT FOR MILKING MACHINES
Filed March 16, 1923 3 Sheets-Sheet 2
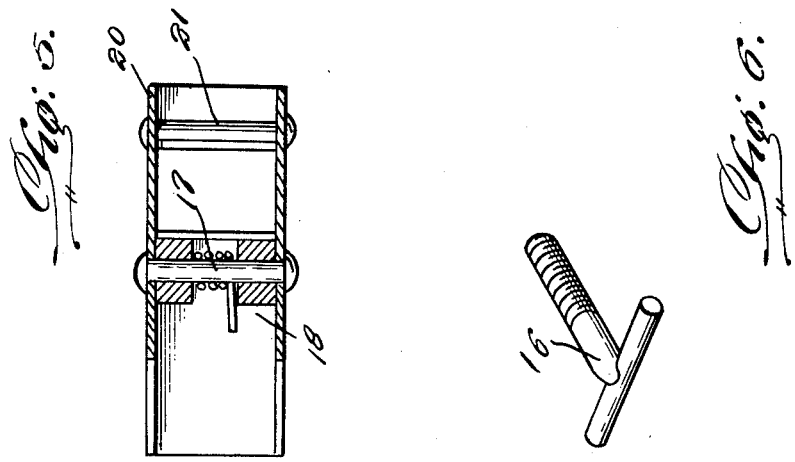
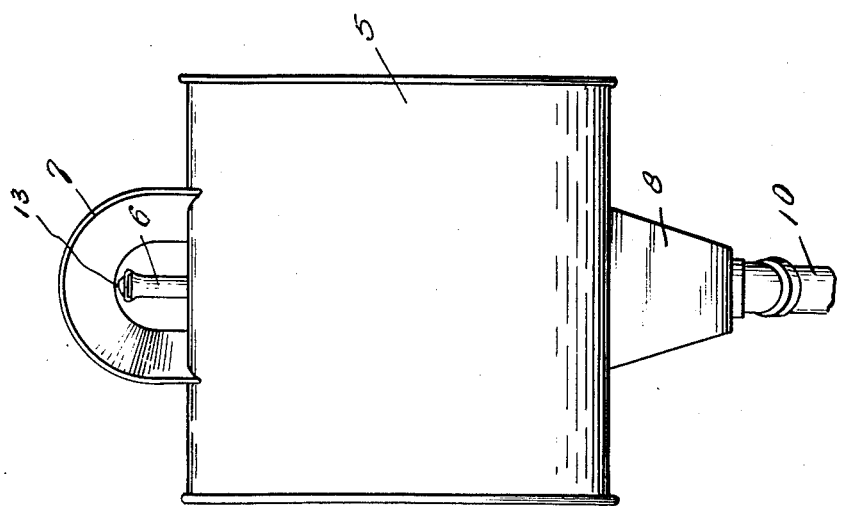
Witnesses:
F. L. Fox.
N. Berman
G. W. Walker,
Inventor
By Clarence A. O'Brien
Attorney April 14, 1925.
G. W. WALKER
ANIMAL SPRAYING ATTACHMENT FOR MILKING MACHINES
Filed March 16, 1923 3 Sheets-Sheet 3
1,533,578
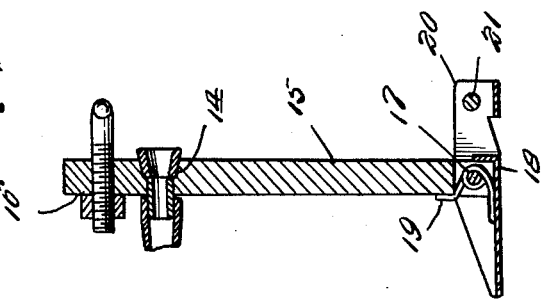
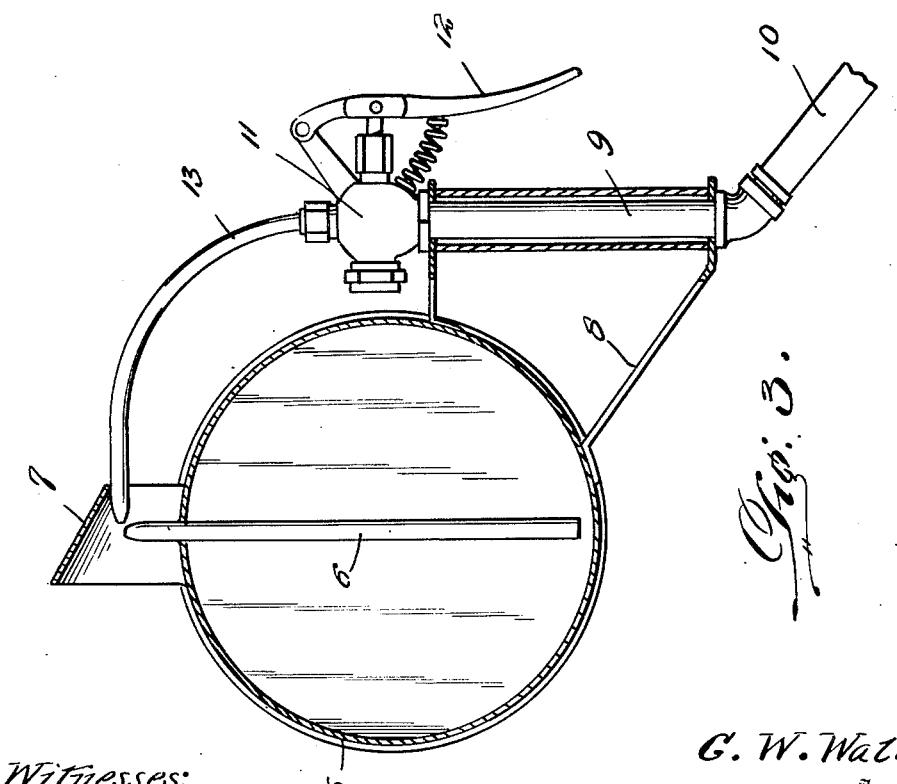

Patented Apr. 14, 1925.

1,533,578

UNITED STATES PATENT OFFICE.

GEORGE W. WALKER, OF PLATTEVILLE, WISCONSIN.

ANIMAL-SPRAYING ATTACHMENT FOR MILKING MACHINES.

Application filed March 16, 1923. Serial No. 625,435.

*To all whom it may concern:*

Be it known that GEORGE W. WALKER, a citizen of the United States, residing at Platteville, in the county of Grant and State of Wisconsin, has invented certain new and useful Improvements in Animal-Spraying Attachments for Milking Machines, of which the following is a specification.

My invention relates to an improved animal spraying device adapted for ready attachment to the usual pressure line of well known types of milking machines, the invention being characterized by its simplicity of construction, inexpensiveness of manufacture and high usefulness of purpose.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, wherein:

Figure 2 is a front elevation of the fluid tank of the spraying machine;

Figure 3 is a detail cross section of this tank together with its directly associated parts;

Figure 4 is a cross section of the securing member between the pressure pipe of the milking machine and the pressure conveying tube of my attachment;

Figure 5 is a detail cross section upon the line 5—5 of Figure 1; and

Figure 6 is a perspective of the T bolt forming a part of the securing member in Figure 4.

Figure 1:
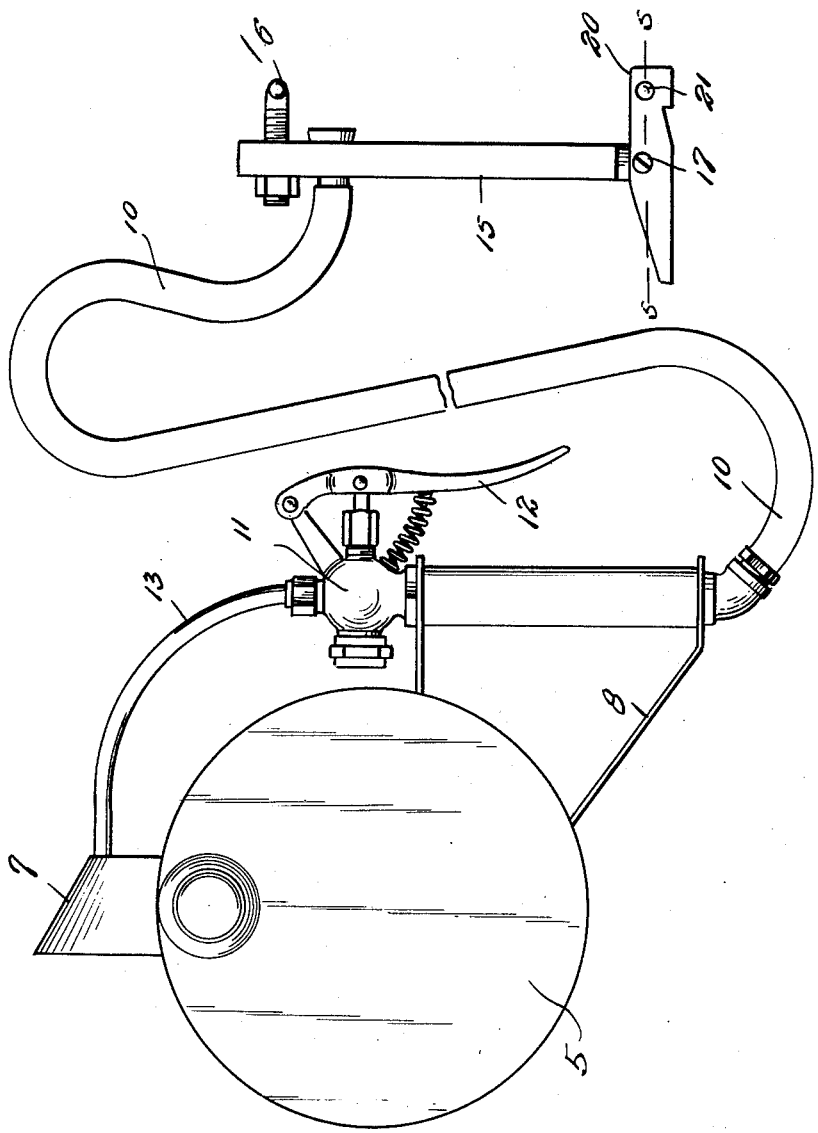
Figure 1 is an elevation of my spraying attachment per se.

Referring to the drawings in detail, 5 designates the disinfectant tank within which is an outlet tube 6, the lower end thereof being slightly spaced from the bottom of the tank while the upper end thereof extends outwardly to an opening in the tank as more clearly shown in Figures 2 and 3. Formed upon the said tank 5 and above the outlet end of said tube 6 is a fluid deflection hood 7.

The tank 5 is provided with a desirable form of handle 8 which carries a pipe section 9, one end thereof having connection to one end of a flexible tube 10 and secured to the opposite end of this pipe section is a desirable form of valve 11 provided with the usual spring pressed operating lever 12. The outlet nipple of this valve 11 has secured thereto a tube 13, the same being bent forwardly as to have its outlet end directly adjacent the outlet end of the said tube 6 within the tank 5.

It is generally well known that practically all types of milking machines include a vacuum and pressure pipe and secured to each of these pipes are what are generally termed stall fixtures, these fixtures adapted for in turn having secured thereto the pulsators of the milking machines. It is generally understood that these so called stall fixtures comprise a pair of clamp plates, the opposite ends of the lower clamp plate being clawed. The opposite end of the said flexible tube 10 of my attachment is engaged over one projecting end of a nipple 14 positioned within an opening adjacent one end of a cross plate 15. One end of this cross plate 15 is provided with a T bolt 16 while hingedly secured at 17 to the opposite end of said plate is a clamping member 18, the same being normally extended at right angles to the plate 15 through the medium of a spring 19.

As more clearly shown in Figures 4 and 5, the sides of this clamp are provided with flanges and between these flanges and adjacent the front end thereof is a cross pin 21. In the practical application of my device to a milking machine any desirable one of the milking machine pulsators is removed from its stall fixtures after which the headed end of the bolt 16 may be engaged with the adjacent clawed end of the lower clamp plate comprising the fixture. It is to be understood that the pressure and vacuum lines of the milking machine are provided with outlets and inlets respectively in communication with the passages through the lower clamping plate. The bolt 16 is engaged with the clawed end of the stall fixture clamping plate adjacent to the pressure line of the milking machine for permitting the said nipple 14 to have close contact with the pressure outlet of this clamp plate.

It will, of course, be understood that the cross pin 21 of the clamp 18 upon the end of the plate 15 is engaged with the opposite clawed end of the said clamp section of the milking machine stall fixture and in view of the hinged connection between this clamp and the said plate the device may be readily attached to or removed from the stall fixture in a simple and expeditious manner.

In view of the above description it will at once be apparent that when the tank 5 is filled with a disinfectant material and the rubber hose 10 of the attachment has communication with the pressure pipe of the milking machine a depression of the valve handle 12 will permit the escape of the air pressure through the tube 13 which will create a suction within the tank tube 6 for consequently drawing the disinfectant out of the tank and ejecting the same forwardly in the form of a spray.

Although I have herein shown and described the preferred embodiment of the present invention, it is nevertheless to be understood that minor changes may be made therein, without departing from the spirit of the invention as claimed.

Having thus described my invention, What I claim as new and desire to secure by Letters Patent is:

An animal spraying device including a tank, a bracket mounted on the tank and having a tubular handle portion, a pipe turnably mounted in the tubular handle portion of the bracket and traversing the length thereof, a valve casing mounted upon the pipe, a tube communicating with the interior of the tank and having an end portion disposed beyond the side thereof, and a second tube rigidly connected with the valve casing and provided with an angular configuration and having one end disposed adjacent the end of the first mentioned tube.

In testimony whereof I affix my signature.

GEORGE W. WALKER.